(12) United States Patent
Varricchio

(10) Patent No.: US 12,085,952 B2
(45) Date of Patent: Sep. 10, 2024

(54) FLOW-BASED MOTION PLANNING BLUEPRINT FOR AUTONOMOUS VEHICLES

(71) Applicant: Waymo LLC, Mountain View, CA (US)

(72) Inventor: Valerio Varricchio, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 330 days.

(21) Appl. No.: 17/474,266

(22) Filed: Sep. 14, 2021

(65) Prior Publication Data

US 2023/0082264 A1   Mar. 16, 2023

(51) Int. Cl.
  *B60W 60/00*    (2020.01)
  *G05D 1/00*    (2006.01)

(52) U.S. Cl.
  CPC ......... *G05D 1/0274* (2013.01); *G05D 1/0212* (2013.01)

(58) Field of Classification Search
  CPC . B60W 60/001; G05D 1/0212; G05D 1/0274; G05D 2201/0213
  See application file for complete search history.

(56) References Cited

U.S. PATENT DOCUMENTS

| | | | | |
|---|---|---|---|---|
| 2018/0281191 A1* | 10/2018 | Sinyavskiy | ........ | G01C 21/3407 |
| 2019/0317520 A1* | 10/2019 | Zhang | .................. | G05D 1/0221 |
| 2019/0361431 A1* | 11/2019 | Choi | ....................... | G06F 3/015 |
| 2020/0149898 A1* | 5/2020 | Felip Leon | ........ | G01C 21/3844 |
| 2022/0001872 A1* | 1/2022 | Taieb | ..................... | G01C 21/20 |

OTHER PUBLICATIONS

Wikipedia, "Potential flow", https://en.wikipedia.org/wiki/Potential_flow, 10 pages, [retrieved from the internet on Sep. 14, 2021].
Wikipedia, "Laplace's equation", https://en.wikipedia.org/wiki/Laplace%27s_equation, 13 pages, [retrieved from the Internet on Sep. 14, 2021].

* cited by examiner

*Primary Examiner* — Matthew J. Reda
(74) *Attorney, Agent, or Firm* — LOWENSTEIN SANDLER LLP

(57) ABSTRACT

A system includes a memory device, and a processing device, operatively coupled to the memory device, to receive a set of input data including a representation of a drivable space for an autonomous vehicle (AV), generate, based on the representation of the drivable space, a motion planning blueprint from a flow field modeling the drivable space, and identify, using the motion planning blueprint, a driving path of the AV within the drivable space.

18 Claims, 8 Drawing Sheets

US 12,085,952 B2

FLOW-BASED MOTION PLANNING BLUEPRINT FOR AUTONOMOUS VEHICLES

TECHNICAL FIELD

The instant specification generally relates to autonomous vehicles. More specifically, the instant specification relates to implementing a flow-based motion planning blueprint for autonomous vehicles (AVs).

BACKGROUND

An autonomous (fully and partially self-driving) vehicle (AV) operates by sensing an outside environment with various electromagnetic (e.g., radar and optical) and non-electromagnetic (e.g., audio and humidity) sensors. Some autonomous vehicles chart a driving path through the environment based on the sensed data. The driving path can be determined based on Global Positioning System (GPS) data and road map data. While the GPS and the road map data can provide information about static aspects of the environment (buildings, street layouts, road closures, etc.), dynamic information (such as information about other vehicles, pedestrians, streetlights, etc.) is obtained from contemporaneously collected sensing data. Precision and safety of the driving path and of the speed regime selected by the autonomous vehicle depend on timely and accurate identification of various objects present in the driving environment and on the ability of a driving algorithm to process the information about the environment and to provide correct instructions to the vehicle controls and the drivetrain.

SUMMARY

In one implementation, disclosed is a system including a memory device and a processing device operatively coupled to the memory device. The processing device is to receive a set of input data including a representation of a drivable space for an autonomous vehicle (AV), generate, based on the representation of the drivable space, a motion planning blueprint from a flow field modeling the drivable space, and identify, using the motion planning blueprint, the a driving path of the AV within the drivable space.

In another implementation, disclosed is a method. The method includes receiving, by a processing device, a set of input data including a representation of a drivable space for an autonomous vehicle (AV), generating, by the processing device based on the representation of the drivable space, a motion planning blueprint from a flow field modeling the drivable space, and identifying, by the processing device using the motion planning blueprint, a driving path of the AV within the drivable space.

In yet another implementation, disclosed is a non-transitory computer-readable storage medium having instructions stored thereon that, when executed by a processing device, cause the processing device to perform operations including obtaining a discretized representation of a drivable space for an autonomous vehicle (AV). The discretized representation includes a plurality of cells, a first end corresponding to a traffic inlet and a second end corresponding to a traffic outlet. The operations further include converting the discretized representation into a flow field data structure modeling the drivable space by determining a potential value assigned to each cell of a plurality of cells of the discretized representation. The first end includes a first cell having a first potential value corresponding to a lower bound of a range of potential values, and the second end includes a second cell having a second assigned potential value corresponding to an upper bound of a range of potential values. The operations further include generating a motion planning blueprint from the flow field data structure, and identifying, using the motion planning blueprint, a driving path of the AV within the drivable space.

BRIEF DESCRIPTION OF THE DRAWINGS

The disclosure is illustrated by way of examples, and not by way of limitation, and can be more fully understood with references to the following detailed description when considered in connection with the figures, in which.

DETAILED DESCRIPTION

Figure 1:
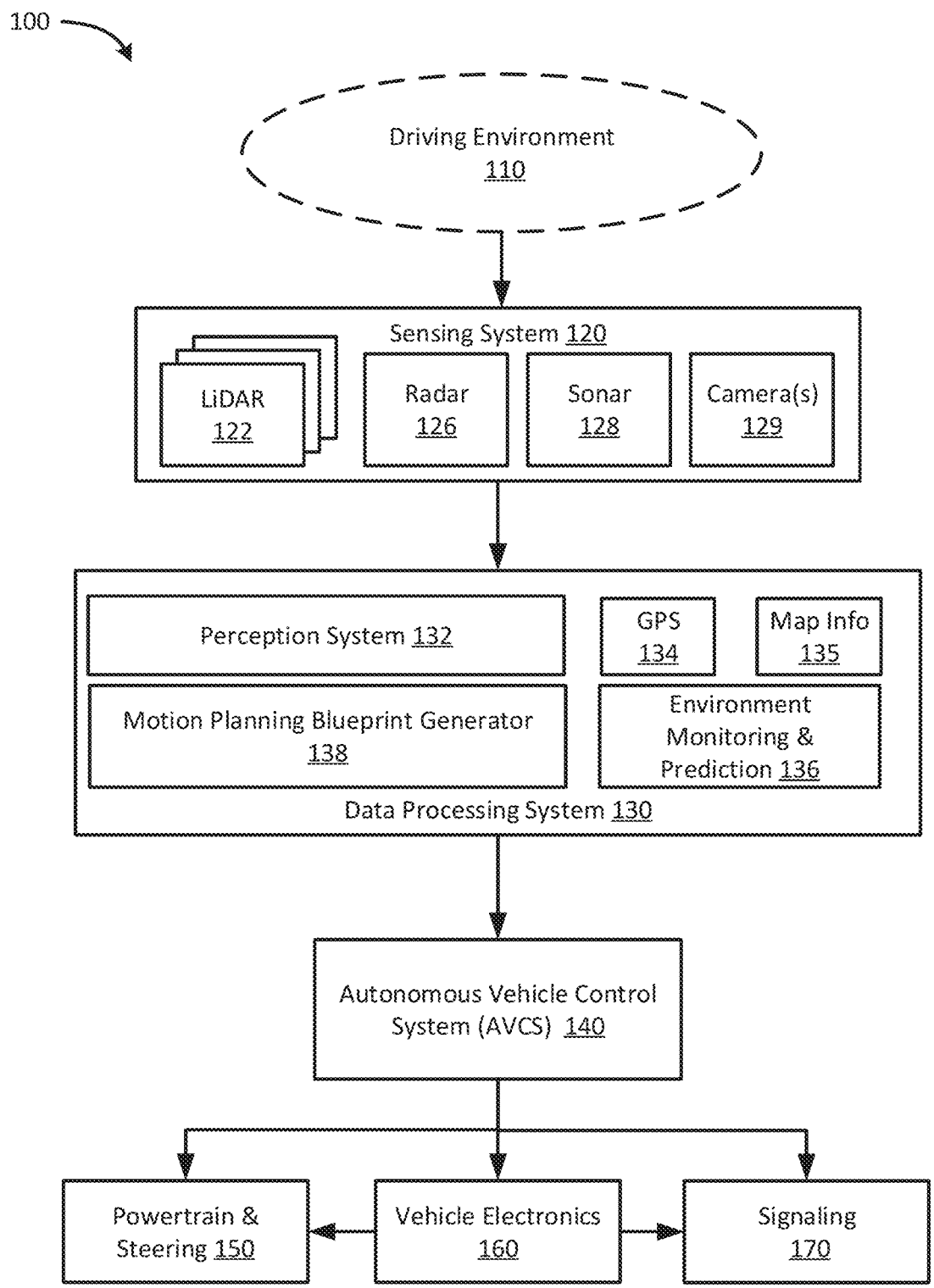
FIG. 1 is a diagram illustrating components of an example autonomous vehicle capable of implementing synthetic scenes, in accordance with some implementations of the present disclosure.

An autonomous vehicle (AV) performs vehicle actions, such as braking, steering, and throttling, to move the AV from the starting location to the destination location along the route. The AV can include a planning module that receives route data (e.g., from a server) that includes particular roads to travel from the starting location to the destination location. The planning module (also referred to herein as a "routing module") receives sensor data from the perception system (e.g., vehicle sensors) that indicates locations of other objects. The routing module uses the sensor data, the route data and predictions about how various objects of the AV driving environment will be positioned to generate short time horizon routing data. The short time horizon routing data includes instructions of how to control the AV over a short interval of time (e.g., the next 10 seconds). The short time horizon routing data may be generated (e.g., regenerated, refreshed) very frequently (e.g., every 100 milliseconds (ms)). By being generated very frequently, the short time horizon routing data can reflect substantially all the changes in the vehicle or the world (e.g., engine degradation, other objects changing course or speed or appearing suddenly). The routing module provides the short time horizon routing data to a motion control module. The motion control module controls the vehicle systems over the next interval of time (e.g., the next 10 seconds, next 100 ms) based on the short time horizon routing data. The routing module continues generating (e.g., refreshing) new short time horizon routing data for the subsequent intervals of time based on the route data and the current sensor data from the perception system. The motion control module continues controlling the vehicle based on the new short time horizon routing data.

AV motion planning methods can involve utilization of data derived from curves on a pre-mapped roadgraph (e.g., heading and curvature). A roadgraph is a polyline graph representing drivable paths or lanes. In an unstructured scenario that includes, for example, a turn, intersection, construction zone detour, narrow street, double parked vehicle, other objects (e.g., other vehicles, bicyclists, pedestrians, cones), etc., mapped lanes may be poorly defined or may not be a sufficiently good proxy for realistic vehicle motion. Therefore, motion planning approaches that rely on pre-mapped lane geometries can cause an AV to not react to turns, intersections, etc. promptly and/or can cause an AV to follow unrealistic or unnatural motion trajectories.

Aspects of the disclosure address the above challenges, along with others, by implementing a motion planning blueprint for autonomous vehicle (AV) motion planning. The motion planning blueprint can be used to approximate realistic motion (e.g., forward motion) at all points inside of a given road geometry. For example, the motion planning blueprint can be used to plan AV motion through an unstructured scenario, as described above. The motion planning blueprint can be generated by the AV in real-time or near real-time at each motion planning iteration (e.g., tens of times per second) while the AV drives or plans to drive through the unstructured scenario. By doing so, the AV can react to unstructured scenarios that would not be captured by a pre-constructed roadgraph map.

The motion planning blueprint can employ principles of fluid flow to model natural motion trajectories through a drivable space. For example, the motion planning blueprint can include a dense vector field describing vehicle motion (e.g., forward motion) through a drivable space defined with specified traffic inlet(s) and outlet(s). The dense vector field can be used to sample a discrete set of vehicle poses that can aid in motion planning, such as by serving as a basis for a graph for search algorithms, devising cost functions or heuristics for optimization, etc.

The dense vector field can be constructed using the geometry of the drivable space and a fluid flow model that approximates vehicle motion through a geometry (e.g., forward vehicle motion), where the inlets are translated into fluid flow sources ("sources") and the outlets are translated into fluid flow sinks ("sinks") within the fluid flow model. For example, a representation of a drivable space can be received as input, and a flow field data structure can be generated as output, where the flow field data structure can provide smooth heading and curvature for any point in space (e.g., x-y coordinate point). The flow field data structure can be used to identify equipotential contour curves, and generate samples for modeling flow paths with respect to the contour curves that cover the drivable space with improved connectivity.

Aspects and implementations disclosed herein provide numerous advantages over existing technologies. For example, the motion planning blueprint described herein can improve error metrics that compare the generated motion plan with historical driving data, collected from a fleet of vehicles operating in the real world. Additionally, the motion planning blueprint described herein can reduce the stranding behavior exhibited by autonomous vehicles, which can occur in situations when pre-mapped lanes do not represent a realistic motion of traffic. As a result, the motion planning blueprint can enable an autonomous vehicle to drive through unstructured scenarios such as construction zones, turns, intersections, etc. more promptly and by following a more natural motion trajectory. Accordingly, the motion planning blueprint can offer improved realism and fidelity over lanes in pre-constructed roadgraph maps.

FIG. 1 is a diagram illustrating components of an example autonomous vehicle (AV) 100 capable of using motion patterns for object classification and tracking, in accordance with some implementations of the present disclosure. FIG. 1 illustrates operations of the example autonomous vehicle. Autonomous vehicles can include motor vehicles (cars, trucks, buses, motorcycles, all-terrain vehicles, recreational vehicle, any specialized farming or construction vehicles, and the like), aircraft (planes, helicopters, drones, and the like), naval vehicles (ships, boats, yachts, submarines, and the like), or any other self-propelled vehicles (e.g., sidewalk delivery robotic vehicles) capable of being operated in a self-driving mode (without a human input or with a reduced human input).

A driving environment 110 can include any objects (animated or non-animated) located outside the AV, such as roadways, buildings, trees, bushes, sidewalks, bridges, mountains, other vehicles, pedestrians, and so on. The driving environment 110 can be urban, suburban, rural, and so on. In some implementations, the driving environment 110 can be an off-road environment (e.g. farming or agricultural land). In some implementations, the driving environment can be an indoor environment, e.g., the environment of an industrial plant, a shipping warehouse, a hazardous area of a building, and so on. In some implementations, the driving environment 110 can be substantially flat, with various objects moving parallel to a surface (e.g., parallel to the surface of Earth). In other implementations, the driving environment can be three-dimensional and can include objects that are capable of moving along all three directions (e.g., balloons, leaves, etc.). Hereinafter, the term "driving environment" should be understood to include all environments in which an autonomous motion of self-propelled vehicles can occur. For example, "driving environment" can include any possible flying environment of an aircraft or a marine environment of a naval vessel. The objects of the driving environment 110 can be located at any distance from the AV, from close distances of several feet (or less) to several miles (or more).

The example AV 100 can include a sensing system 120. The sensing system 120 can include various electromagnetic (e.g., optical) and non-electromagnetic (e.g., acoustic) sensing subsystems and/or devices. The terms "optical" and "light," as referenced throughout this disclosure, are to be understood to encompass any electromagnetic radiation (waves) that can be used in object sensing to facilitate autonomous driving, e.g., distance sensing, velocity sensing, acceleration sensing, rotational motion sensing, and so on. For example, "optical" sensing can utilize a range of light visible to a human eye (e.g., the 380 to 700 nm wavelength range), the ultraviolet range (below 380 nm), the infrared range (above 700 nm), the radio frequency range (above 1 m), etc. In implementations, "optical" and "light" can include any other suitable range of the electromagnetic spectrum.

The sensing system 120 can include a radar unit 126, which can be any system that utilizes radio or microwave frequency signals to sense objects within the driving environment 110 of the AV 100. The radar unit can be configured to sense both the spatial locations of the objects (including their spatial dimensions) and their velocities (e.g., using the Doppler shift technology). Hereinafter, "velocity" refers to both how fast the object is moving (the speed of the object) as well as the direction of the object's motion.

The sensing system 120 can include one or more lidar sensors 122 (e.g., lidar rangefinders), which can be a laser-based unit capable of determining distances (e.g., using ToF technology) to the objects in the driving environment 110. The lidar sensor(s) can utilize wavelengths of electromagnetic waves that are shorter than the wavelength of the radio waves and can, therefore, provide a higher spatial resolution and sensitivity compared with the radar unit. The lidar sensor(s) can include a coherent lidar sensor, such as a frequency-modulated continuous-wave (FMCW) lidar sensor. The lidar sensor(s) can use optical heterodyne detection for velocity determination. In some implementations, the functionality of a ToF and coherent lidar sensor(s) is combined into a single (e.g., hybrid) unit capable of determining both the distance to and the radial velocity of the reflecting object. Such a hybrid unit can be configured to operate in an incoherent sensing mode (ToF mode) and/or a coherent sensing mode (e.g., a mode that uses heterodyne detection) or both modes at the same time. In some implementations, multiple lidar sensor(s) 122 units can be mounted on AV, e.g., at different locations separated in space, to provide additional information about a transverse component of the velocity of the reflecting object, as described in more detail below.

The lidar sensor(s) 122 can include one or more laser sources producing and emitting signals and one or more detectors of the signals reflected back from the objects. The lidar sensor(s) 122 can include spectral filters to filter out spurious electromagnetic waves having wavelengths (frequencies) that are different from the wavelengths (frequencies) of the emitted signals. In some implementations, the lidar sensor(s) 122 can include directional filters (e.g., apertures, diffraction gratings, and so on) to filter out electromagnetic waves that can arrive at the detectors along directions different from the retro-reflection directions for the emitted signals. The lidar sensor(s) 122 can use various other optical components (lenses, mirrors, gratings, optical films, interferometers, spectrometers, local oscillators, and the like) to enhance sensing capabilities of the sensors.

In some implementations, the lidar sensor(s) 122 can scan 360-degree in a horizontal direction. In some implementations, the lidar sensor(s) 122 can be capable of spatial scanning along both the horizontal and vertical directions. In some implementations, the field of view can be up to 90 degrees in the vertical direction (e.g., with at least a part of the region above the horizon being scanned by the lidar signals). In some implementations, the field of view can be a full sphere (consisting of two hemispheres). For brevity and conciseness, when a reference to "lidar technology," "lidar sensing," "lidar data," and "lidar," in general, is made in the present disclosure, such reference shall be understood also to encompass other sensing technology that operate at generally in the near-infrared wavelength, but may include sensing technology that operate at other wavelengths.

The sensing system 120 can further include one or more cameras 129 to capture images of the driving environment 110. The images can be two-dimensional projections of the driving environment 110 (or parts of the driving environment 110) onto a projecting plane (flat or non-flat, e.g. fisheye) of the cameras. Some of the cameras 129 of the sensing system 120 can be video cameras configured to capture a continuous (or quasi-continuous) stream of images of the driving environment 110. The sensing system 120 can also include one or more sonars 128, which can be ultrasonic sonars, in some implementations.

The sensing data obtained by the sensing system 120 can be processed by a data processing system 130 of AV 100. For example, the data processing system 130 can include a perception system 132. The perception system 132 can be configured to detect and/or track objects in the driving environment 110 and to recognize the objects. For example, the perception system 132 can analyze images captured by the cameras 129 and can be capable of detecting traffic light signals, road signs, roadway layouts (e.g., boundaries of traffic lanes, topologies of intersections, designations of parking places, and so on), presence of obstacles, and the like. The perception system 132 can further receive the lidar sensing data (coherent Doppler data and incoherent ToF data) to determine distances to various objects in the environment 110 and velocities (radial and, in some implementations, transverse, as described below) of such objects. In some implementations, the perception system 132 can use the lidar data in combination with the data captured by the camera(s) 129. In one example, the camera(s) 129 can detect an image of a scene, such as a construction zone scene. Using the data from the camera(s) 129, lidar data, etc., the perception system 132 can be capable of determining the existence of objects within the scene (e.g., cones). For example, the perception system 132 can include a scene recognition component 133.

The perception system 132 can further receive information from a GPS transceiver (not shown) configured to obtain information about the position of the AV relative to Earth. The GPS data processing module 134 can use the GPS data in conjunction with the sensing data to help accurately determine location of the AV with respect to fixed objects of the driving environment 110, such as roadways, lane boundaries, intersections, sidewalks, crosswalks, road signs, surrounding buildings, and so on, locations of which can be provided by map information 135. In some implementations, the data processing system 130 can receive non-electromagnetic data, such as sonar data (e.g., ultrasonic sensor data), temperature sensor data, pressure sensor data, meteorological data (e.g., wind speed and direction, precipitation data), and the like.

The data processing system 130 can further include an environment monitoring and prediction component 136, which can monitor how the driving environment 110 evolves with time, e.g., by keeping track of the locations and velocities of the animated objects (relative to Earth). In some implementations, the environment monitoring and prediction component 136 can keep track of the changing appearance of the environment due to motion of the AV relative to the environment. In some implementations, the environment monitoring and prediction component 136 can make predictions about how various animated objects of the driving environment 110 will be positioned within a prediction time horizon. The predictions can be based on the current locations and velocities of the animated objects as well as on the tracked dynamics of the animated objects during a certain (e.g., predetermined) period of time. For example, based on stored data for object 1 indicating accelerated motion of object 1 during the previous 3-second period of time, the environment monitoring and prediction component 136 can conclude that object 1 is resuming its motion from a stop sign or a red traffic light signal. Accordingly, the environment monitoring and prediction component 136 can predict, given the layout of the roadway and presence of other vehicles, where object 1 is likely to be within the next 3 or 5 seconds of motion. As another example, based on stored data for object 2 indicating decelerated motion of object 2 during the previous 2-second period of time, the environment monitoring and prediction component 136 can conclude that object 2 is stopping at a stop sign or at a red traffic light signal. Accordingly, the environment monitoring and prediction component 136 can predict where object 2 is likely to be within the next 1 or 3 seconds. The environment monitoring and prediction component 136 can perform periodic checks of the accuracy of its predictions and modify the predictions based on new data obtained from the sensing system 120.

The data processing system 130 can further include a motion planning blueprint generator 138 to generate a motion planning blueprint. The motion planning blueprint can be generated based on a representation of a drivable space and/or other data obtained by the data processing system 130. The motion planning blueprint 138 can used by the AVCS 140 to make driving decisions. For example, as will be described in further detail herein, the motion planning blueprint can be generated by obtaining a fluid flow model that approximates vehicle motion through a particular path (e.g., road) geometry, and construct a vector field of plausible AV poses using the fluid flow model.

The data generated by the perception system 132, the GPS data processing module 134, the environment monitoring and prediction component 136, and the motion planning blueprint generator 138 can be received by an autonomous driving system, such as AV control system (AVCS) 140. The AVCS 140 can include one or more algorithms that control how the AV is to behave in various driving situations and environments.

For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (cones, rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as the powertrain and steering 150, vehicle electronics 160, signaling 170, and other systems and components not explicitly shown in FIG. 1. The powertrain and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain and steering 150 (or signaling 170) whereas other instructions output by the AVCS 140 are first delivered to the vehicle electronics 160, which generate commands to the powertrain and steering 150 and/or signaling 170.

In one example, the AVCS 140 can determine that an obstacle identified by the data processing system 130 is to be avoided by decelerating the vehicle until a safe speed is reached, followed by steering the vehicle around the obstacle. The AVCS 140 can output instructions to the powertrain and steering 150 (directly or via the vehicle electronics 160) to 1) reduce, by modifying the throttle settings, a flow of fuel to the engine to decrease the engine rpm, 2) downshift, via an automatic transmission, the drivetrain into a lower gear, 3) engage a brake unit to reduce (while acting in concert with the engine and the transmission) the vehicle's speed until a safe speed is reached, and 4) perform, using a power steering mechanism, a steering maneuver until the obstacle is safely bypassed. Subsequently, the AVCS 140 can output instructions to the powertrain and steering 150 to resume the previous speed settings of the vehicle.

Figure 2:
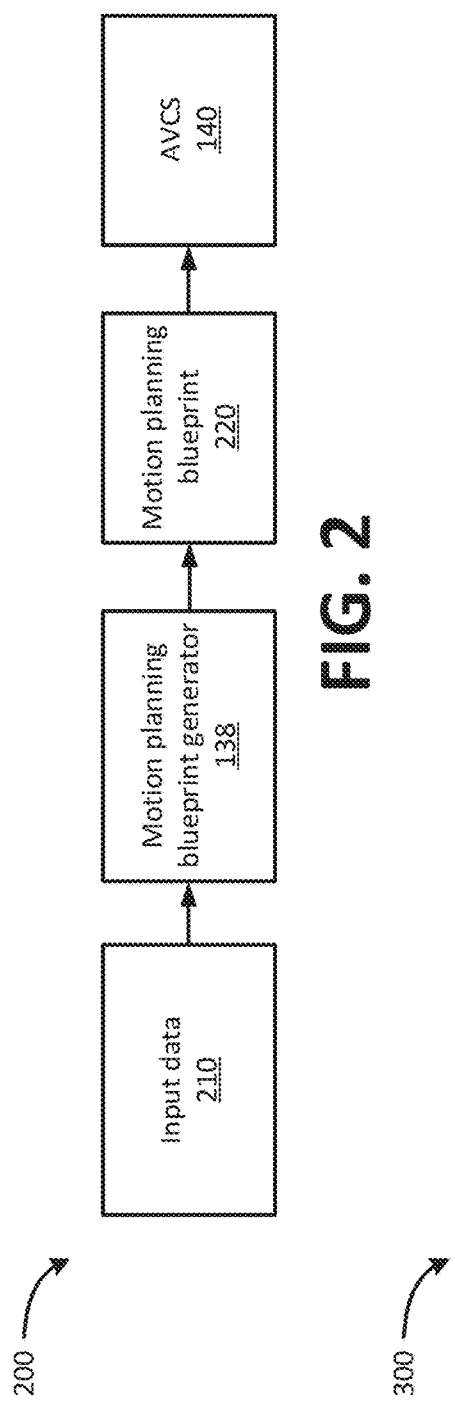
FIG. 2 is a diagram illustrating an example a system for generating and utilizing a motion planning blueprint for an autonomous vehicle (AV), in accordance with some implementations of the present disclosure.

FIG. 2 is a diagram illustrating an example system 200 for generating and utilizing a motion planning blueprint for an autonomous vehicle (AV), in accordance with some implementations of the present disclosure. The system 200 can be used in driving environments in which it would be preferable to choose AV poses based on the geometry of the space, as opposed to prerecorded lane geometries. For example, the driving environment can include an unstructured scenario, such as a turn, intersection, construction zone detour, narrow street, double parked vehicle, presence of other objects (e.g., other vehicles, pedestrians, cones), etc.

As shown, input data 210 is received by a motion planning blueprint generator 138. The input data 210 can include a representation of a drivable space. The drivable space can be provided as a free or open space. For example, the representation of the drivable space can include an image of the drivable space in a vector representation (e.g., vector graphics format, center reference curve and width function, or a vector description of its boundary). The representation of the drivable space can incorporate information gathered from perception, routing, and localization, and can include stationary objects not present in offline maps to facilitate nudging behaviors. For example, the drivable space can include at least one of a turn, an intersection, a construction zone, a narrow street, etc.

The motion planning blueprint generator 138 generates a motion planning blueprint 220 in view of the input data 210. To do so, the motion planning blueprint generator 138 can obtain a flow field modeling the drivable space. For example, given the geometry of the drivable space, the motion planning blueprint generator 138 can construct a vector field (e.g., dense vector field) of plausible AV poses based on a fluid flow model through the drivable space. Further details regarding the motion planning blueprint generator 138 will be described below with reference to FIG. 3. The motion planning blueprint 220 is received by the AVCS 140. For example, the motion planning blueprint 220 can be used by the AVCS 140 to plan a driving path for the AV to take within a corresponding drivable space. The motion planning blueprint 220 can offer the AV a more realistic driving pattern for planning the driving path as compared to, e.g., pre-mapped paths or lanes.

Figure 3:
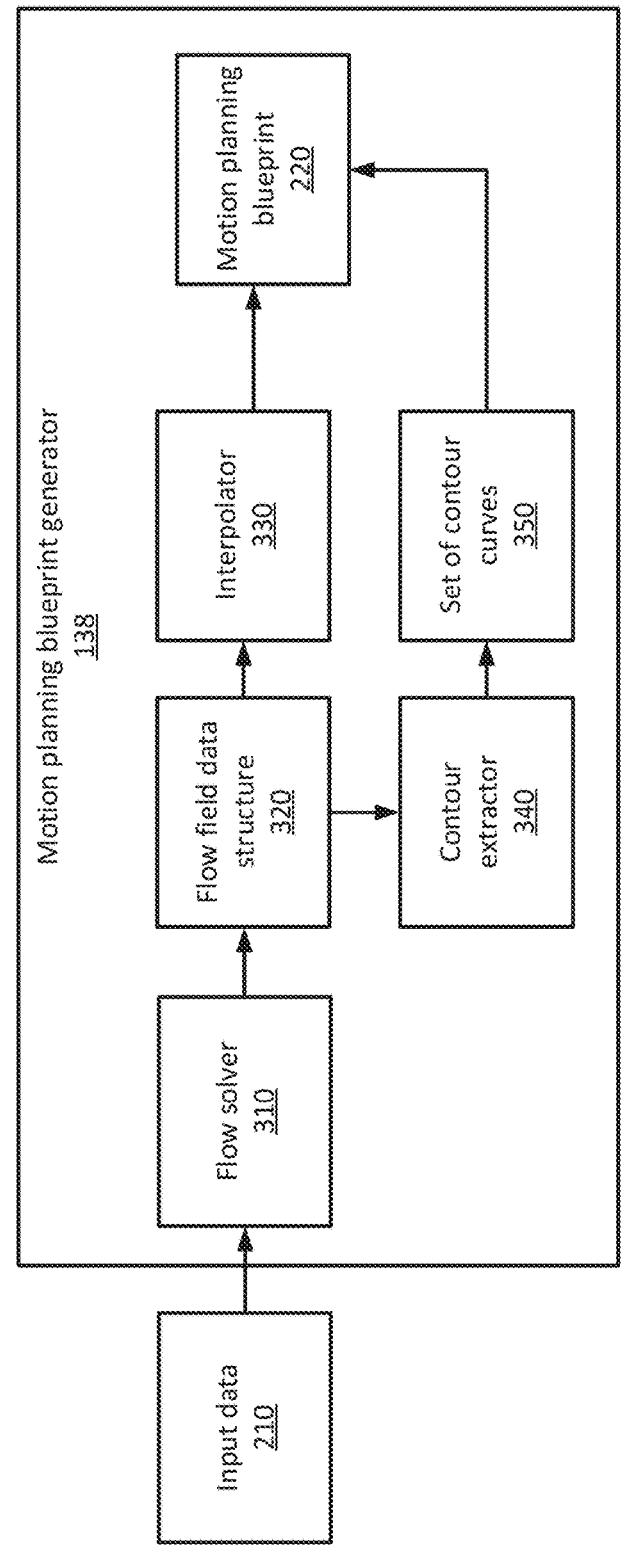
FIG. 3 is a diagram illustrating an example system for generating a motion planning blueprint for an autonomous vehicle (AV), in accordance with some implementations of the present disclosure.

FIG. 3 is a diagram illustrating an example system 300 for generating a motion planning blueprint for an autonomous vehicle (AV), in accordance with some implementations of the present disclosure. The system 300 includes the motion planning blueprint generator 138 described above with reference to FIGS. 1 and 2. In this illustrative example, the motion planning blueprint generator 138 includes a number of sub-components. However, this example should not be considered limiting.

For example, the motion planning blueprint generator 138 can include a flow solver 310. The flow solver 310 receives the input data 210 including the representation of the drivable space, as described above with reference to FIG. 2. Using the input data 210, the flow solver 310 can generate a flow field data structure 320. To generate the flow field data structure 320, the flow solver 310 can first rasterize the vector representation of the drivable space to obtain a discretized representation of the drivable space ("discretized representation"). Rasterization generally refers to the process of converting a vector representation of a shape into a discretized representation of the shape. The discretized representation of the drivable space includes a number of cells (e.g., grid cells, polygon mesh cells). The rasterization process can mark the cells at the entrance or traffic inlet of the drivable space ("source cells"), and the cells at the exit or traffic outlet of the drivable space ("sink cells").

The flow solver 310 can then assign a potential value to each of the cells of the discretized representation of the drivable space. Each potential value is a scalar value reflective of a potential. For example, the source cells can be assigned a potential of 0.0, the sink cells can be assigned a potential of 1.0, and the other cells can be assigned a potential based on a suitable function. For example, the potential of the other cells can be determined as an average of neighboring cells. The potential values, once determined, provide a solution to the flow problem for the drivable space. The potential conditions can be cast by employing a linear system that can be solved efficiently, so that the AV can perform the computation onboard and in real-time or near real-time. For example, the linear system can be a Symmetric Positive Semi-Definite (SPD) linear system. The flow solver 310 can then generate a flow field data structure 320. The flow field data structure 320 maintains a list of the cells and their respective potential values. Further details regarding the operations of the flow solver 310 are described below with reference to FIGS. 8-10.

The motion planning blueprint generator 138 can further include an interpolator 330. In some implementations, the interpolator 330 is implemented as a public application programming interface (API). At an arbitrary location within the drivable space (e.g., an (x,y) coordinate), the interpolator 330 can obtain a set of interpolated motion parameters associated with the arbitrary location. The set of interpolated motion parameters can include an interpolated heading or velocity at the arbitrary location, and an interpolated curvature at the arbitrary location.

To perform the interpolation to obtain the set of parameters, a set of precomputed motion parameters including precomputed headings/velocities and precomputed curvatures at the centers of the cells of the discretized representation of the drivable space can be obtained. The precomputed heading/velocity and curvature at the center of a cell can be obtained via numerical differentiation. The set of interpolated motion parameters can be obtained via interpolation using the set of precomputed motion parameters. For example, the interpolated heading/velocity at the arbitrary location can be obtained by evaluating gradients of the potentials at cell centers using finite differences, and extending the gradients to the arbitrary location via interpolation. The interpolated curvature can be similarly obtained from an interpolated Hessian of the potential at cell centers. Further details regarding obtaining the set of precomputed motion parameters and the set of interpolated motion parameters will be described herein below.

The motion planning blueprint generator 138 can further include a contour extractor 340 to extract a set of contour curves 350 within the discretized representation of the drivable space that have a constant potential (a set of equipotential contour curves). The contour curves of the set of contour curves 350 do not intersect one another, by construction. To extract a given contour curve, the contour extractor 340 can take, as input, a desired potential level (e.g., between 0 and 1), and output at least one contour curve at the desired potential level. The desired potential level can, in some cases, corresponding to multiple disjoint contour curves. For example, the contour extractor 340 can construct the contour curve by searching boundary edges of the grid where the potential crosses the desired potential level, and then greedily proceeding through the interior by iteratively exploring the neighboring boundary edge crossing the desired level. Closed-loop contour curves are not possible in this formulation as the potential does not have local minima/maxima in the interior of the representation of the drivable space. Therefore, by virtue of the maximum principle, all of the contour curves start or end on a boundary edge. Further details regarding operations performed by the contour extractor 340 will be described below with reference to FIG. 11.

Figure 4:
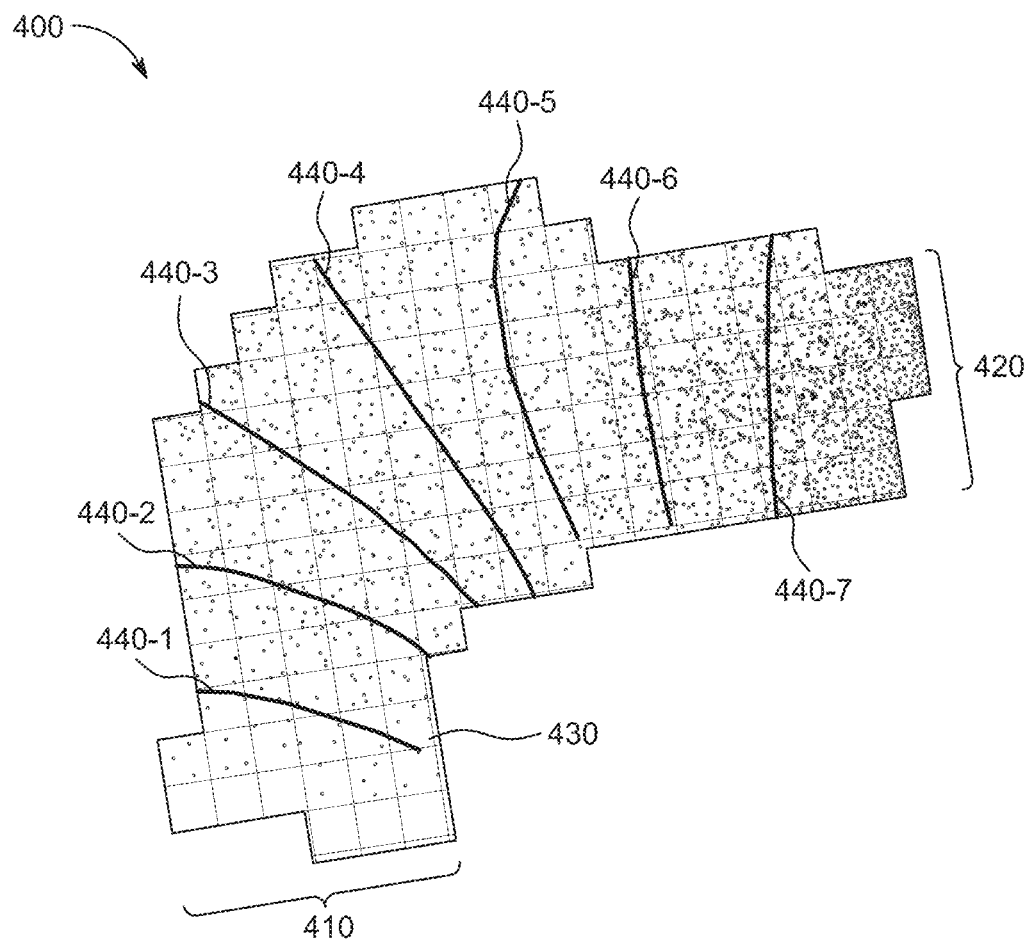
FIG. 4 is a diagram illustrating an example drivable space representation 400 after performing flow solving and contour extraction, in accordance with some implementations of the present disclosure.

FIG. 4 is a diagram illustrating an example drivable space representation 400 after performing flow solving and contour extraction, in accordance with some implementations of the present disclosure. For example, the flow solving can be performed by the flow solver 310 of FIG. 3 and the contour extraction can be performed by the contour extractor 340 of FIG. 3.

The drivable space representation 400 can include a number of cells obtained from a representation of the drivable space (e.g., by converting a vector representation of the drivable space into a discretized representation of the drivable space). In this illustrative example, the drivable space representation 400 corresponds to a curve or turn. However, such an example should not be considered limiting.

As shown, the drivable space representation 400 includes a first end 410 having a number of cells corresponding to an entrance of traffic inlet of the drivable space (e.g., source region), a second end 420 including a number of cells corresponding to an exit or traffic outlet of the drivable space (e.g., a sink region), and an intermediate region 430 defined between the first end 410 and the second end 420 corresponding to traffic flow from the first end 410 to the second end 420. A potential value can be assigned to each of the cells of the discretized representation of the drivable space 400, where each potential value is a scalar value reflective of a potential. The stippling pattern shown in FIG. 4 indicates the increase in potential value from the first end 410 to the second end 420. In some implementations, the potential values are real number values selected from the interval [a, b], where a≠b. The cells of the first end 410 can be assigned a potential value of a, the cells of the second end 420 can be assigned a potential value of b, and the cells in the intermediate region 430 can be assigned a potential value between a and b. For example, the cells of the first end 410 can be assigned a potential value of "0" and the cells of the second end 420 can be assigned a potential value of "1," where the cells in the intermediate region 430 can be assigned a potential value between 0 and 1. The potential value of the cells in the intermediate region 430 can be determined in accordance with a suitable potential value assignment function. For example, the value of the cells of the intermediate region 430 can be determined as an average of neighboring cells.

As further shown, the drivable space representation 400 can include a number of contour curves including contour curves 440-1 through 440-7. Although seven contour curves are shown in this illustrative example, the drivable space representation 400 can include any suitable number of contour curves. As will be described in further detail below, nodes can be plotted along the contour curves to model traffic flow paths from the first end 410 to the second end 420.

Referring back to FIG. 3, the motion planning blueprint 220 can be obtained based on the set of contour curves 350 and the set of interpolated motion parameters generated by the interpolator 330. The motion planning blueprint 220 corresponds to a vector field of plausible AV poses within the drivable space. Obtaining the motion planning blueprint 220 can include generating a set of geometric samples 350 based on the set of contour curves 350 and the set of interpolated motion parameters. For example, locations (e.g., (x,y) coordinate locations) can be chosen at some constant interval on each contour curve of the set of contour curves, and a geometric sample can be generated for each of the locations by using the set of interpolated motion parameters. For example, each geometric sample can include a location, the interpolated heading at the location and the interpolated curvature at the location.

The motion planning blueprint 220 can then be constructed in the form of a graph having a number of nodes and edges. Each node corresponds to a geometric sample positioned with respect its location on a contour curve, and each edge connects nodes on other contour curves that are reachable from one another. The edges can be built by using motion primitives connecting nodes that are reachable from one another. Since the contour curves do not cross and the interpolated heading and curvature are appropriately determined for each location, the graph does not include any overlapping nodes (which could occur when sampling orthogonally to a pre-mapped lane). Further details regarding generating the motion planning blueprint 220 will be described below.

Figure 5:
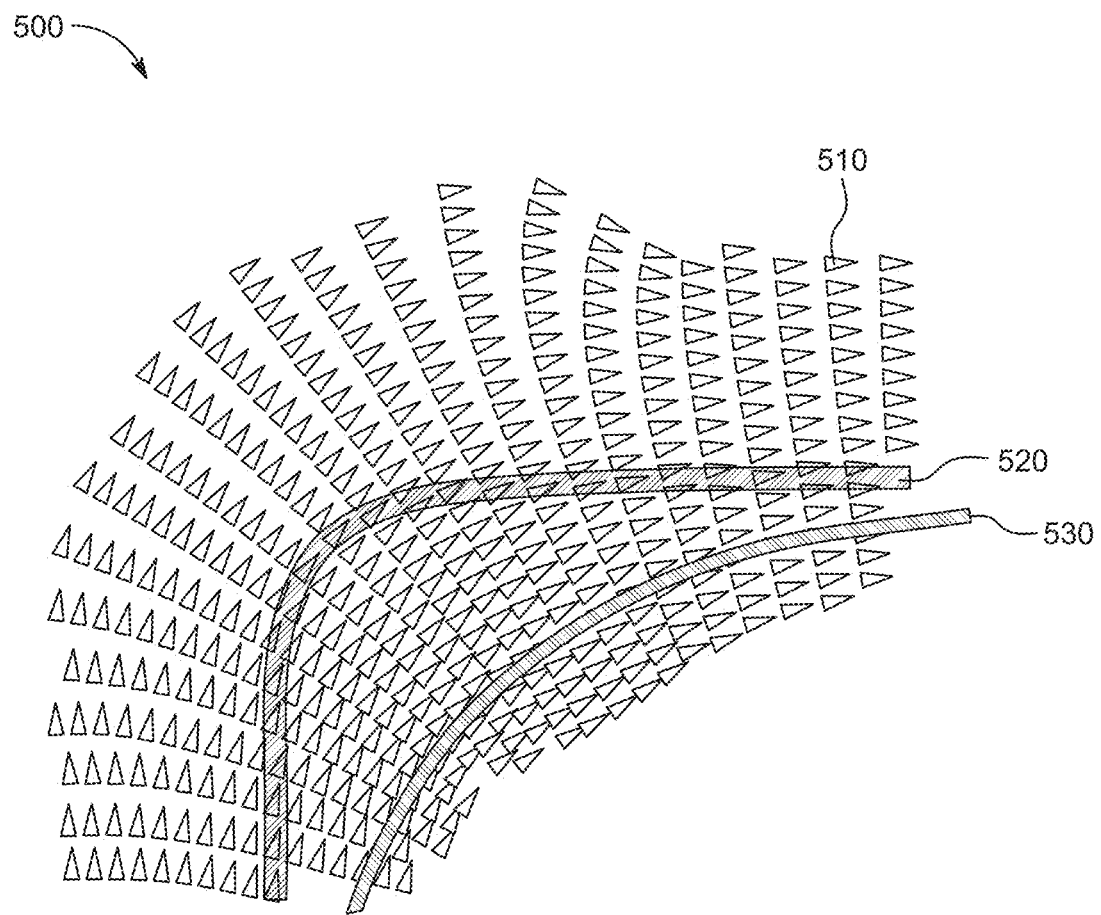
FIG. 5 is a diagram illustrating the plotting of geometric samples as nodes with respect to a drivable space representation, in accordance with some implementations of the present disclosure.

FIG. 5 is a diagram 500 illustrating a motion planning blueprint, in accordance with some implementations of the present disclosure. The motion planning blueprint can be the motion planning blueprint 220, as described above with reference to FIG. 2. The nodes 510 can be placed along contour curves (not shown in FIG. 5) to model traffic flow paths (e.g., streamlines) from a first end to a second end. For example, each of the nodes 510, by virtue of the interpolation process to obtain geometric samples, has a proper heading and curvature with local connectivity. A reference curve 520, which can be pre-mapped from the roadgraph, and an average driven traffic flow path 530, which can be obtained from real-world AV driving data, are superimposed on the nodes 510 for illustrative purposes. The reference curve 520 corresponds to a comparison between the more realistic motion planning blueprint, and the less realistic pre-mapped lane corresponding to the same driving scenario.

Figure 6:
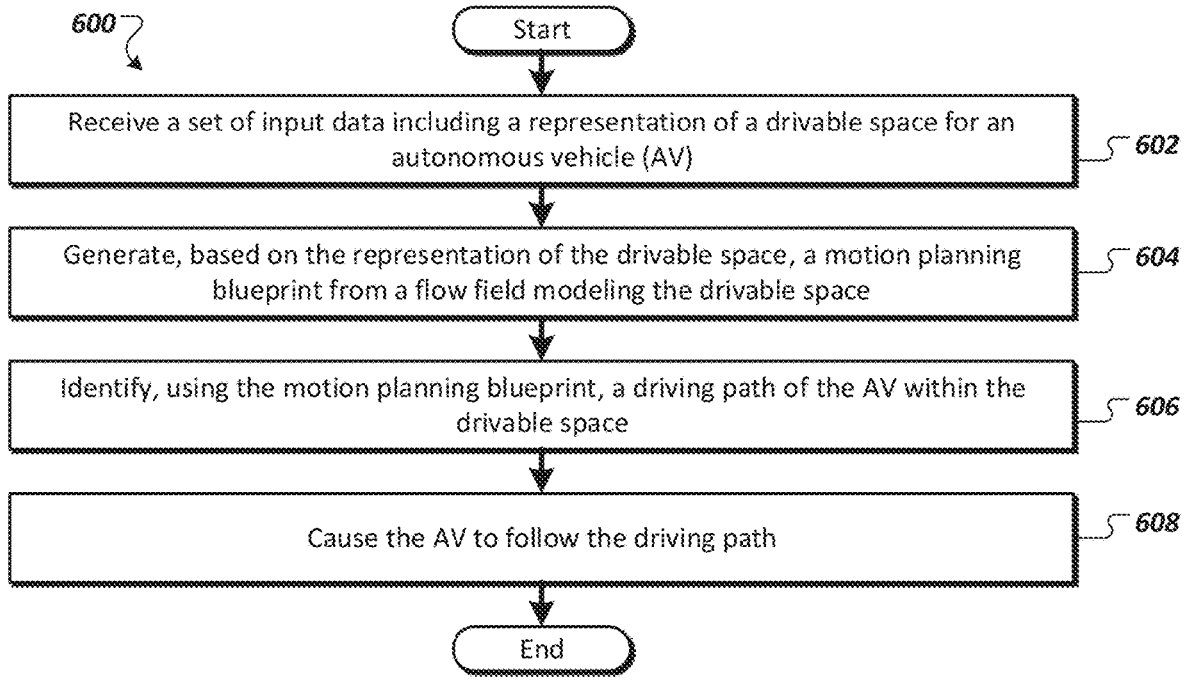
FIG. 6 is a flow diagram of an example method of generating and utilizing a motion planning blueprint for an autonomous vehicle (AV), in accordance with some implementations of the present disclosure.

FIG. 6 is a flow diagram of an example method 600 of obtaining and utilizing a motion planning blueprint for an autonomous vehicle (AV), in accordance with some implementations of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. For example, the processing logic can be included within an AV (e.g., the AV 100 of FIG. 1). Although shown in a particular sequence or order, unless otherwise specified, the order of the processes can be modified. Thus, the illustrated implementations should be understood only as examples, and the illustrated processes can be performed in a different order, and some processes can be performed in parallel. Additionally, one or more processes can be omitted in various implementations. Thus, not all processes are required in every implementation. Other process flows are possible.

At operation 602, the processing logic receives a set of input data including a representation of a drivable space for an autonomous vehicle (AV). The representation of the drivable space can incorporate information gathered from perception, routing, and localization, and can include stationary objects not present in offline maps to facilitate nudging behaviors. For example, the drivable space can include at least one of a turn, an intersection, free space adjacent to a construction zone, free space adjacent to a stalled or double-parked vehicle, a narrow street, a forked path, etc. In some implementations, the representation of the drivable space received at operation 602 can be a vector representation of the drivable space (e.g., a vector graphics representation, a center reference curve and a width function, or a vector description of its boundary). In some implementation, the representation of the drivable space received at operation 602 can be a discretized representation of the drivable space including a number of cells (e.g., grid cells, polygon mesh cells).

At operation 604, the processing logic generates, based on the representation of the drivable space, a motion planning blueprint from a flow field modeling the drivable space. For example, given the geometry of the drivable space, the processing logic can construct a vector field of plausible AV poses based on a fluid flow model through the drivable space. In implementations in which the representation of the drivable space is not received as a discretized representation of the drivable space, generating the motion planning blueprint can further include rasterizing the representation of the drivable space to obtain a discretized representation of the drivable space. Further details regarding operation 604 will be described below with reference to FIG. 7.

At operation 606, the processing logic identifies, using the motion planning blueprint, a driving path of the AV within the drivable space and, at operation 608, the processing logic causes the AV to follow the driving path. For example, the motion planning blueprint can be used by a control system of the AV (e.g., AVCS 140) to plan a driving path for the AV to take within a corresponding drivable space. The motion planning blueprint can offer the AV a more realistic driving pattern for identifying (e.g., planning) the driving path as compared to, e.g., pre-mapped paths or lanes. Further details regarding operations 602-608 are described above with reference to FIGS. 1-5.

Figure 7:
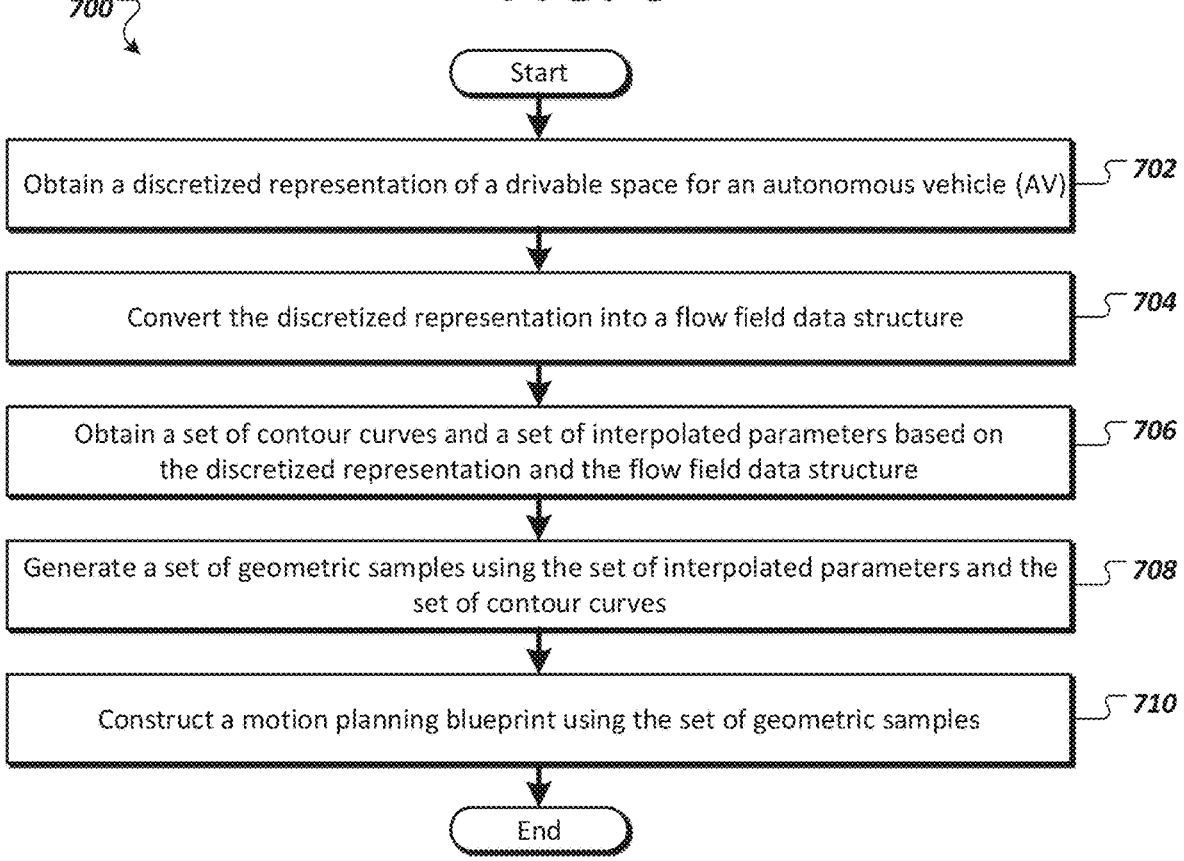
FIG. 7 is a flow diagram of an example method of generating a motion planning blueprint for an autonomous vehicle (AV), in accordance with some implementations of the present disclosure.

FIG. 7 is a flow diagram of an example method 700 of generating a motion planning blueprint for an autonomous vehicle (AV), in accordance with some implementations of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. For example, the processing logic can be included within an AV (e.g., the AV 100 of FIG. 1). Although shown in a particular sequence or order, unless otherwise specified, the order of the processes can be modified. Thus, the illustrated implementations should be understood only as examples, and the illustrated processes can be performed in a different order, and some processes can be performed in parallel. Additionally, one or more processes can be omitted in various implementations. Thus, not all processes are required in every implementation. Other process flows are possible.

At operation 702, the processing logic obtains a discretized representation of a drivable space for an autonomous vehicle (AV). In some implementations, the processing logic receives the discretized representation of the drivable space as part of a set of input data (e.g., operation 602 of FIG. 6). In some implementations, the processing logic obtains the discretized representation of the drivable space by converting a non-discretized representation of the drivable space (e.g., vector representation of the drivable space) into the discretized representation of the drivable space. The discretized representation of the drivable space includes a number of cells (e.g., grid cells, polygon mesh cells). For example, converting the non-discretized representation of the drivable space into the discretized representation of the drivable space can include rasterizing the non-discretized representation of the drivable space. The cells at the entrance or traffic inlet of the drivable space can be marked as source cells, and the cells at the exit or traffic outlet of the drivable space can be marked as sink cells.

At operation 704, the processing logic converts the discretized representation of the drivable space into a flow field data structure. Converting the discretized representation of the drivable space into the flow field data structure can include assigning a potential value to each of the cells of the discretized representation of the drivable space. Each potential value is a scalar value reflective of a potential. For example, the source cells can be assigned a potential of 0.0, the sink cells can be assigned a potential of 1.0, and the other cells can be assigned a potential based on a suitable function. For example, the potential of the other cells can be determined as an average of neighboring cells. The potential values, once determined, provide a solution to the flow problem for the drivable space. The potential conditions can be cast by employing a linear system that can be solved efficiently, so that the AV can perform the computation onboard. For example, the linear system can be a Symmetric Positive Semi-Definite (SPD) linear system.

At operation 706, the processing logic obtains a set of interpolated motion parameters and a set of contour curves based on the discretized representation and the flow field data structure. The set of interpolated motion parameters can include, for a given location, an interpolated heading/velocity and interpolated curvature. The interpolated motion parameters of the set of interpolated motion parameters can each be obtained by employing respective numerical differentiation techniques based on a set of precomputed motion parameters. For example, an interpolated heading/velocity can be obtained as an interpolated gradient of the potential corresponding to the given location, and the interpolated curvature can be obtained from an interpolated Hessian of the potential corresponding to the given location. The interpolated gradient can be obtained by evaluating gradients at cell centers using finite differences, and then extending the gradients to the given location via interpolation (e.g., bilinear interpolation). A similar process can be used to obtain the interpolated Hessian.

The set of contour curves can include one or more equipotential contour curves each extracted from the discretized representation of the drivable space based on a desired potential level (e.g., between 0 and 1). Each contour curve can be constructed by greedily searching boundary edges of the grid where the potential crosses the desired potential level. Further details regarding obtaining the set of interpolated motion parameters and the set of contour curves are described above with reference to FIG. 3 and will be described herein below.

At operation 708, the processing logic generates a set of geometric samples using the set of interpolated motion parameters and the set of contour curves. Each geometric sample can be defined for a given location within the drivable space along a contour curve, and can include the heading at the given location and the curvature at the given location. Further details regarding generating the set of geometric samples are described above with reference to FIG. 3 and will be described herein below.

At operation 710, the processing logic constructs a motion planning blueprint based on the set of geometric samples. The motion planning blueprint 220 corresponds to a vector field of plausible AV poses within the drivable space. For example, the motion planning blueprint can be constructed as a graph. The graph includes nodes each corresponding to a geometric sample positioned with respect to the location of the corresponding sample on its contour curve, and edges that connect nodes on other contour curves that are reachable from one another. The edges can be built by using motion primitives connecting nodes that are reachable from one another. Since the contour curves of the set of contour curves do not cross, and since the heading and curvature are appropriately determined for each location, the graph does not include any overlapping nodes (which could occur when sampling orthogonally to a pre-mapped lane). Further details regarding constructing the motion planning blueprint are described above with reference to FIG. 3 and will be described herein below.

Further details regarding the operations performed by the system 300 of FIG. 3 will now be described. Formally, the operations performed by the flow solver 310 are derived from potential flow theory. It is assumed that the velocity of a fluid is the gradient of a scalar velocity potential function which solves the Laplace equation. More specifically, $$v(x, y) = \nabla \varphi(x, y) \tag{1}$$

and $$\Delta \varphi = \frac{\partial^2 \varphi}{\partial x^2} + \frac{\partial^2 \varphi}{\partial y^2} = 0 \, \forall \, (x, y) \in \Omega \tag{2}$$

where x and y are geometric coordinates in the x-y plane with a drivable space $\Omega$, v is velocity, $\varphi$ is the scalar velocity potential function, $\nabla(\cdot)$ is the gradient operator, and $\Delta(\cdot) = \nabla \cdot \nabla(\cdot)$ is the Laplacian operator (i.e., divergence of the gradient operator). Boundary conditions can be defined with respect to the drivable space to render the Laplace equation solvable. For example, on a boundary $\Lambda$ of the drivable space $\Omega$, the component of the velocity along the normal $\vec{n}$ to the boundary $\Lambda$ may be zero: $\vec{v} \cdot \vec{n} = \Lambda \varphi(x,y) \cdot \vec{n} = 0$.

With respect to the boundary conditions, in order to set the flow in motion from the entrance(s) (source) to the exit(s) (sink) of the drivable space, the potential should be set to increase from the source to the sink. As described above, the source is assigned a potential of 0.0 and the sink is assigned a potential of 1.0 without loss of generality (since other solutions will be affine) because the direction of the velocity, referred to as heading, is what matters in this model.

Equation (2) may be referred to as a continuous field equation. A general analytical solution to the continuous field equation may not be readily available. In order for the flow solver 310 to obtain a solution, a discretized field equation can be obtained by utilizing a numerical approximation of Equation (2). For example, a symmetric finite difference technique can be employed. Thus, the use of the discretized field equation improves the ability of the flow solver 310 to generate the flow field data structure 320. Further details regarding obtaining the discretized field equation will now be described below with reference to FIG. 8.

Figure 8:
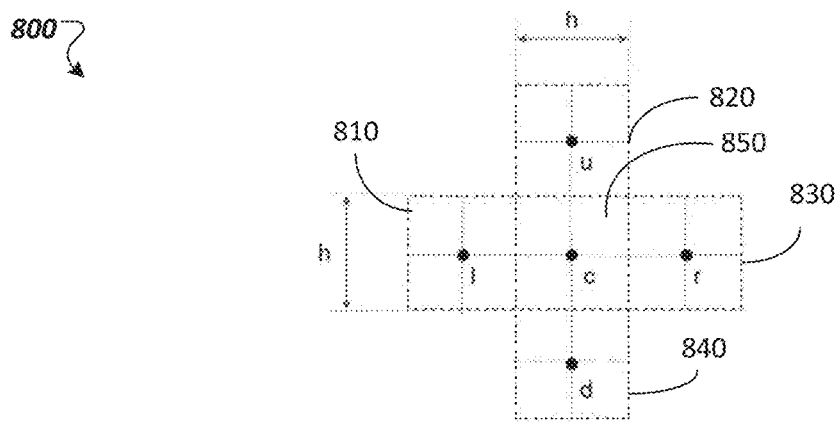
FIG. 8 is a diagram of a numerical stencil that can be used to obtain a discretized field equation using a symmetric finite difference technique, in accordance with some implementations of the present disclosure.

FIG. 8 is a diagram of a numerical stencil 800 that can be used to obtain a discretized field equation using a symmetric finite difference technique, in accordance with some implementations of the present disclosure. More specifically, the numerical stencil 800 is a four-connected numerical stencil. As shown, the numerical stencil 800 includes a number of neighboring cells, including a left cell 810 having a center point "l", an upper cell 820 having a center point "u", a right cell 830 having a center point "r", a down cell 840 having a center point "d" and a center cell 850 having a center point "c". Each cell has a side length of "h".

Using the numerical stencil 800 and symmetric finite differences, the Laplacian operator of the potential at the center cell 850 can be approximated as follows:

$$\frac{\partial^2 \varphi}{\partial x^2}\bigg|_c \approx \frac{\varphi_l - 2\varphi_c + \varphi_r}{h^2} \tag{3}$$

$$\frac{\partial^2 \varphi}{\partial y^2}\bigg|_c \approx \frac{\varphi_u - 2\varphi_c + \varphi_d}{h^2} \tag{4}$$

$$\Delta \varphi|_c = \frac{\partial^2 \varphi}{\partial x^2}\bigg|_c + \frac{\partial^2 \varphi}{\partial y^2}\bigg|_c \approx \frac{\varphi_l + \varphi_r + \varphi_u + \varphi_d - 4\varphi_c}{h^2} \tag{5}$$

Setting Equation (5) to equal zero and solving for $\varphi_c$:

$$\varphi_c \approx \frac{\varphi_l + \varphi_r + \varphi_u + \varphi_d}{4} \tag{6}$$

Equation (6) indicates that the potential at the center cell 850 is the average of the values of its neighboring cells 810-840. By extension, if there are fewer than four neighboring cells (e.g., the center cell 850 is a boundary cell), the average is computed over the available neighboring cells.

The above results can be used to formulate a linear system that approximates the potential for all of the cells over the discretized representation of the drivable space. In particular, the unknowns of the linear system are the values of the potential of the cells of the discretized representation of the drivable space. Let $c = (c_0, \ldots, c_{N-1})$ define the set of N cells in the discretized representation of the drivable space, $x = (x_0, \ldots, x_{N-1})$ be the set of potential values of the cells $c_0$ through $c_{N-1}$, I be the set of inlet cell (source) indices, O be the set of outlet cell (sink) indices, M be the number of cells that are neither source nor sink ("flow cells"), $C_{flow} = (k_0, \ldots, k_{M-1})$ be the indices of the flow cells, n(i) be the set of indices of neighbors of cell $c_i$, and d(i) be the cardinality of n(i) (i.e., the number of neighbors of cell $c_i$). It is assumed that I and O are disjoint sets, such that their intersection is the null set.

In view of the above, a raw formulation of the linear system can be defined as:

$$\begin{cases} x_i = 0.0 & \forall \, i \in I \\ x_i = 1.0 & \forall \, i \in O \\ x_i = d(i) \cdot x_i - \sum_{j \in n(i)} x_j = 0.0 & \forall \, i \in C_{flow} \end{cases} \tag{7}$$

Where the conditions in (7) produce a sparse linear system $Ax = b$ with A: N×N being a system matrix and b: N×1 being a vector such that, for all $i, j \in (0, \ldots, N-1)$:

$$A_{ij} = \begin{cases} 1 & \text{if } i = j \text{ and } i \in (I \cup O) \\ d(i) & \text{if } i = j \text{ and } i \notin (I \cup O) \\ -1 & \text{if } i \neq j \text{ and } i \in n(j) \\ 0 & \text{otherwise} \end{cases} \tag{8}$$

$$b_i = \begin{cases} 1 & \text{if } i \in O \\ 0 & \text{otherwise} \end{cases} \tag{9}$$

Because of the source/sink assignment in Equation (7), the matrix A is not symmetric. The sparse linear system can be solved using any suitable sparse matrix solver. Alternatively, the sparse linear system can be further simplified for improved computation by converting the matrix A into a Symmetric Positive Semi-Definite (SPD) matrix in which the sparse linear system does not include sources and sinks. Let s(i) be defined as the number of sink cells neighboring cell $c_i$ and $n_{flow}(i)$ be defined as the set indices of the flow cells neighboring cell $c_i$. A set of M equations can be obtained based on Equation (7) as follows:

$$s(i) = d(i) \cdot x_i - \sum_{j \in n_{flow}(i)} x_j \; \forall i \in C_{flow} \tag{10}$$

Equation (10) results in a smaller system $\overline{A}\overline{x} = \overline{b}$ with $\overline{A}$: M×M being a system matrix and $\overline{b}$: M×1 being a vector such that, for all l, m $\in (0, \ldots, M-1)$:

$$\overline{A}_{lm} = \begin{cases} d(k_l) & \text{if } l = m \\ -1 & \text{if } l \neq m \text{ and } k_l \in n(k_m) \\ 0 & \text{if } l \neq m \text{ and } k_l \notin n(k_m) \end{cases} \tag{11}$$

$$\overline{b}_l = s(l) \tag{12}$$

The symmetry of this system follows from the reciprocity of neighbors ($\overline{A}_{lm}=\overline{A}_{ml}$) and the positive semi-definiteness of this system follows from $\overline{A}$ being a submatrix of the Laplacian matrix of an undirected graph, which is known to be positive semi-definite. The graph in question represents the full discretization or rasterization, in that its nodes represent the cells and its edges represent the neighbor relationships between the cells. Since the system is an SPD system, the system can be solved using a computationally efficient solver that exploits the symmetry. Thus, the implementations described herein can improve the computational performance of the flow solver 310. Further details regarding solving the SPD system will now be described below with reference to FIGS. 9 and 10.

Figure 9:
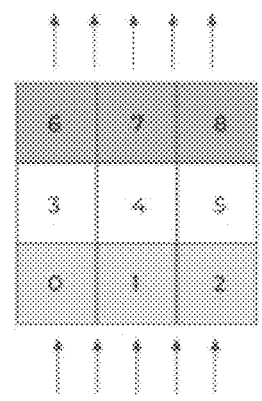
FIG. 9 is a table of values and a diagram of an arrangement of cells in an example discretized drivable space, in accordance with some implementations of the present disclosure.

FIG. 9 is a table 910 of values of i, n(i), d(i) and s(i) and a diagram 920 of a first arrangement of cells in an example discretized representation of the drivable space, in accordance with some implementations of the present disclosure. More specifically, the table 910 and the diagram 920 are described with respect to inlet/source cells I=(0, 1, 2), flow cells $C_{flow}$=(3, 4, 5) and outlet/sink cells O=(6, 7, 8). To solve this system, the s(i) values are placed in the vector $\overline{b}$, the d(i) values are placed on the diagonal of the matrix $\overline{A}$, and a value of −1 is placed in the off-diagonal terms of $\overline{A}$ corresponding to neighbors with unknown potential. For example, the first row refers to cell 3 whose only neighbor with unknown potential is cell 4 (0 and 6 are known) and cell 4 corresponds to the second unknown potential, so −1 is placed in the first row (cell 3), and second column (cell 4). Therefore:

$$\overline{x} = \begin{bmatrix} x_3 \\ x_4 \\ x_5 \end{bmatrix}, \overline{A} = \begin{bmatrix} 3 & -1 & 0 \\ -1 & 4 & -1 \\ 0 & -1 & 3 \end{bmatrix}, \overline{b} = \begin{bmatrix} 1 \\ 1 \\ 1 \end{bmatrix}, \overline{A}\overline{x} = \overline{b} = > \overline{x} = \begin{bmatrix} 0.5 \\ 0.5 \\ 0.5 \end{bmatrix}$$

Figure 10:
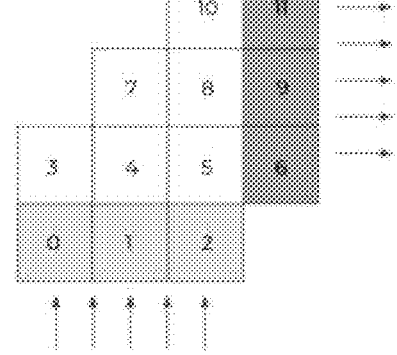
FIG. 10 is a table of values and a diagram of another arrangement of cells in another example discretized drivable space, in accordance with some implementations of the present disclosure.

FIG. 10 is a table 1010 of values of i, n(i), d(i) and s(i) and a diagram 1020 of a second arrangement of cells in an example discretized representation of the drivable space, in accordance with some implementations of the present disclosure. More specifically, the table 1010 and the diagram 1020 are described with respect to inlet/source cells I=(0, 1, 2), flow cells $C_{flow}$=(3, 4, 5, 7, 8, 10) and outlet/sink cells O=(6, 9, 11). To solve this system, the s(i) values are placed in the vector $\overline{b}$, the d(i) values are placed on the diagonal of the matrix $\overline{A}$, and a value of −1 is placed in the off-diagonal terms of $\overline{A}$ corresponding to neighbors with unknown potential, similar to the first arrangement described above with reference to FIG. 9. Therefore:

$$\overline{x} = \begin{bmatrix} x_3 \\ x_4 \\ x_5 \\ x_7 \\ x_8 \\ x_{10} \end{bmatrix}, \overline{A} = \begin{bmatrix} 2 & -1 & 0 & 0 & 0 & 0 \\ -1 & 4 & -1 & -1 & 0 & 0 \\ 0 & -1 & 4 & 0 & -1 & 0 \\ 0 & -1 & 0 & 2 & -1 & 0 \\ 0 & 0 & -1 & -1 & 4 & -1 \\ 0 & 0 & 0 & 0 & -1 & 2 \end{bmatrix},$$

$$\overline{b} = \begin{bmatrix} 0 \\ 0 \\ 1 \\ 0 \\ 1 \\ 1 \end{bmatrix}, \overline{A}\overline{x} = \overline{b} = > \overline{x} = \begin{bmatrix} 1/7 \\ 2/7 \\ 1/2 \\ 1/2 \\ 5/7 \\ 6/7 \end{bmatrix}$$

Now that the potential values of the cells have been obtained by solving the linear system, the set of precomputed motion parameters including precomputed headings and precomputed curvatures at the centers of the cells of the discretized representation of the drivable space can be obtained. For example, the precomputed heading/velocity $v_i$ at the center of a cell $c_i$ can be obtained via numerical differentiation of the potential value $x_i$ at the center of the cell $c_i$. The precomputed curvature $\chi_i$ at the center of the cell $c_i$ can be obtained as:

$$\chi_i = \frac{(v_i \times a_i)}{\|v_i\|^3} \quad (13)$$

$$a_i = J_i v_i \quad (14)$$

$$J_i = \left[ \left(\frac{\partial v}{\partial x}\right)_i \left(\frac{\partial v}{\partial y}\right)_i \right] \quad (15)$$

where $a_i$ is the acceleration at the center of the cell $c_i$ and $J_i$ is the velocity Jacobian at the center of the cell $c_i$. The velocity Jacobian can be computed via numerical differentiation.

Given an arbitrary location P=(x,y) within the drivable space, the set of parameters including the heading/velocity v(x,y) and the curvature $\chi$(x,y) can be obtained via interpolation using the set of precomputed motion parameters. The heading/velocity v(x,y) can be obtained as an interpolated gradient of the potential obtained by evaluating gradients at cell centers using finite differences, and then extending the gradients to the given location via interpolation. The curvature $\chi$(x,y) can be similarly be obtained from an interpolated Hessian of the potential.

For example, the interpolating cells adjacent to P are identified. The interpolating cells can be included in a set A that includes at most 4 cells (e.g., an upper cell, a lower cell, a left cell and a right cell), such that P falls in the convex combination of the centers of the 4 cells, and the centers of any two cells in A are at most $\sqrt{2}h$ away from one another (where h is the side length of the cell as described above with reference to FIG. 8). After the interpolating cells adjacent to P are identified, v(x,y) or $\chi$(x,y) can be found via interpolation of $\{v_i\}_{i \in A}$ or $\{\chi_i\}_{i \in A}$, respectively. For example, bilinear interpolation can be used if the cardinality of A is 4 (i.e., there are 4 interpolating cells adjacent to P), barycentric interpolation can be used if the cardinality of A is 3 (i.e., there are 3 interpolating cells adjacent to P), and linear interpolation can be used if the cardinality of A is 2 (i.e., there are 2 interpolating cells adjacent to P).

The set of contour curves (equipotential contour curves) can then be extracted within the discretized representation of the drivable space. Further details regarding contour curve extraction will now be described below with reference to FIG. 11.

Figure 11:
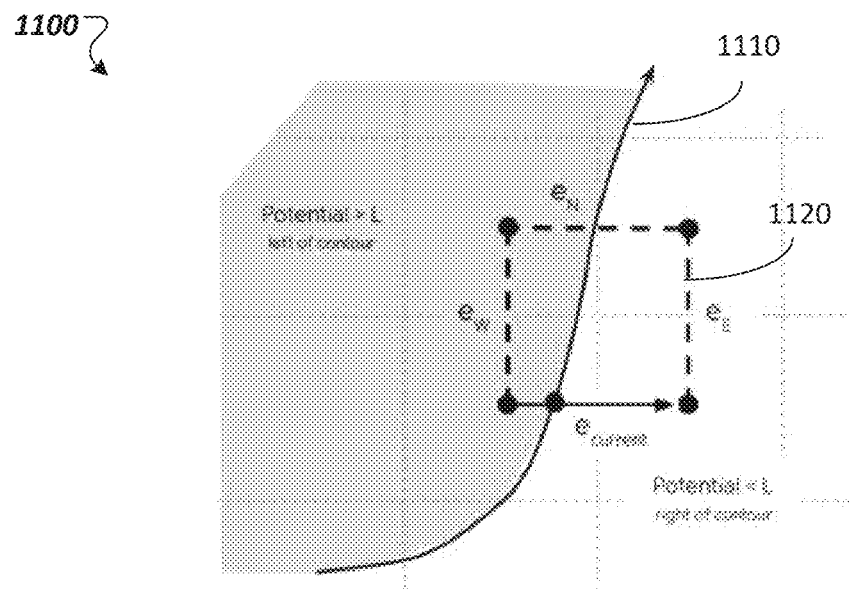
FIG. 11 is a diagram illustrating contour extraction, in accordance with some implementations of the present disclosure.

FIG. 11 is a diagram 1100 illustrating contour extraction, in accordance with some implementations of the present disclosure. In FIG. 11, it is assumed that L is desired potential level, where L∈[0,1], and a contour curve 1110 is being extracted. By convention, contour curves can be oriented such that higher values of the potentials are to the left of each contour curve. For example, as shown in FIG. 11, the potential to the left of the contour curve 1110 is greater than L and the potential to the right of the contour curve 1110 is less than L. A number of boundary edges 1120 are scanned until an edge is found that crosses L, and then a next edge can be located among a set of neighboring edges (e.g., 3 neighboring edges).

Formally, consider boundary edge e=(i,j) connecting cell $c_i$ and cell $c_j$ in the discretized representation of the drivable space, where, without loss of generality, the potential at cell $c_i$, $x_i$ is less than the potential at cell $c_j$, $x_j$. A boundary edge can be said to cross L if and only if (iff) $x_i \leq L < x_j$. A crossing point P(e,L) can be defined as:

$$P(e,L) = \lambda P_i + (1-A)P_j \qquad (16)$$

where $$\lambda = \frac{x_j - L}{x_j - x_i} \qquad (17)$$

and $P_i$ and $P_j$ are points corresponding to the respective centers of cell $c_i$ and cell $c_j$.

Given the above Equations (16) and (17), contour extraction can be performed using a pair of nested loops. An outer loop of the pair of nested loops can iterate through all the boundary edges of the discretized representation of the drivable space and find a boundary edge eo that crosses L. Once eo is found, the contour curve 1110 is initialized. An inner loop of the pair of nested loops can, given a current crossing boundary edge $e_{current}$, append the crossing point $P(e_{current},L)$ to the contour curve. A next crossing boundary edge $e_{next}$ can then be found and the process repeats. For example, as shown in FIG. 11, given $e_{current}$, a next crossing boundary edge can be found among three candidate boundary edges $e_W$, $e_N$ and $e_E$ arranged relative to $e_{current}$. In the FIG. 11 example, $e_N$ is the next crossing boundary edge of the candidate boundary edges. The inner loop process to identify points on the contour curve 1110 can be repeated until a next crossing boundary edge is not found, as this means that the extraction of the contour curve 1110 is complete. The contour extraction process can be performed to extract any suitable number of contour curves with respect to the discretized representation of the drivable space.

Figure 12:
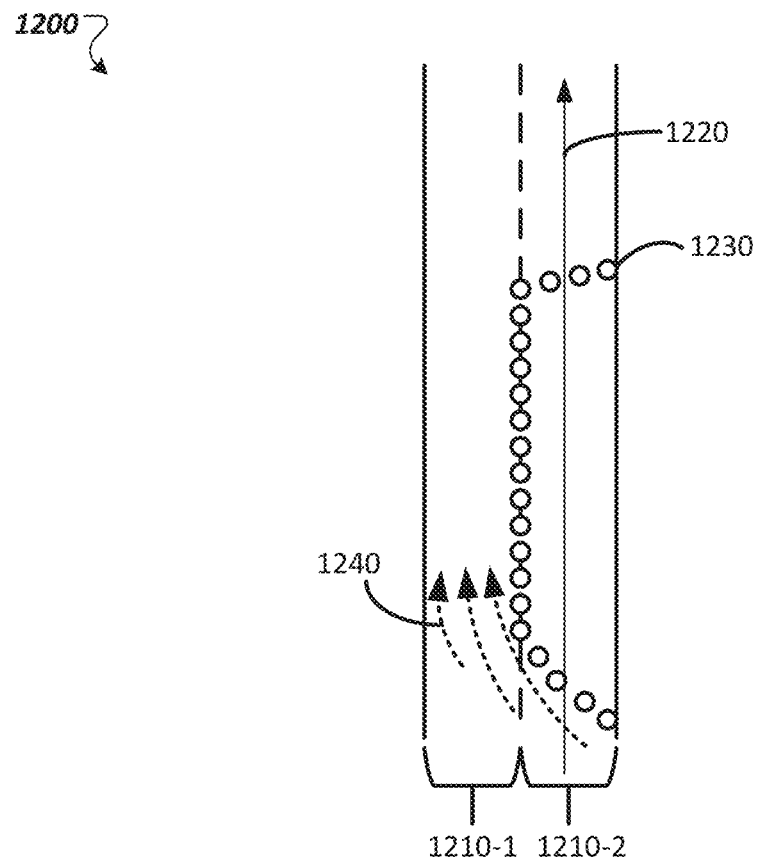
FIG. 12 is a diagram illustrating an example driving scene for implementing a motion planning blueprint, in accordance with some implementations of the present disclosure.

FIG. 12 is a diagram illustrating an example driving scene ("scene") 1200 for implementing a motion planning blueprint, in accordance with some implementations of the present disclosure. The example use case scene 1200 shown in FIG. 12 is of a construction zone. However, the implementations described herein can be employed to plan AV motion within any suitable driving scene.

As shown, the scene 1200 depicts 310 a first lane 1210-1 and a second lane 1210-2. A lane heading 1220 corresponding to a normal or typical path to be taken while driving within the second lane 1210-2 is shown. As further shown, a construction zone defined by a set of objects 1230 (e.g., cones) has blocked off a portion of the second lane 1210-2. The lane heading 1220 thus does not represent the correct way to drive in this scenario. A motion planning blueprint can be constructed by an AV in real-time or near real-time, in accordance with the implementations described herein, to provide a more realistic driving pattern within the drivable space surrounding the construction zone. For example, the AV can define traffic flows (e.g., streamlines) 1240 that take into account the boundary of the construction zone defined by the set of objects 1230.

Figure 13:
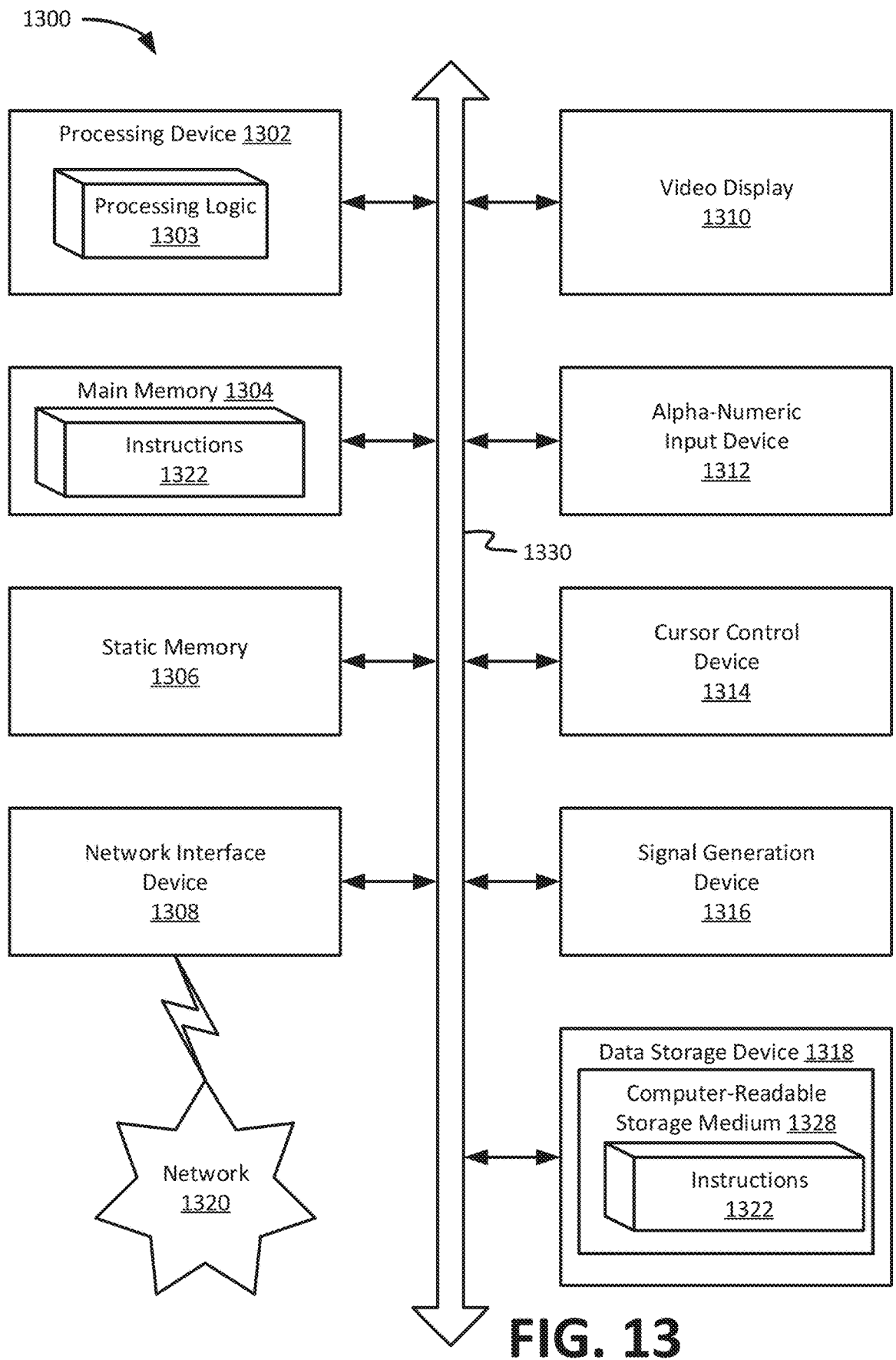
FIG. 13 is a block diagram of an example computer device within which a set of instructions, for causing the machine to perform any of the one or more methodologies discussed herein can be executed, in accordance with some implementations of the disclosure.

FIG. 13 depicts a block diagram of an example computer device 1300 within which a set of instructions, for causing the machine to perform any of the one or more methodologies discussed herein can be executed, in accordance with some implementations of the disclosure. Example computer device 1300 can be connected to other computer devices in a LAN, an intranet, an extranet, and/or the Internet. Computer device 1300 can operate in the capacity of a server in a client-server network environment. Computer device 1300 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" includes any collection of computers that individually or jointly execute a set (or multiple sets) of instructions to perform any one or more of the methods discussed herein. In some implementations, the AV 100 includes the computer device 1300).

The computer device 1300 can include a processing device 1302 (also referred to as a processor or CPU), which can include processing logic 1303, a main memory 1304 (e.g., read-only memory (ROM), flash memory, dynamic random access memory (DRAM) such as synchronous DRAM (SDRAM), etc.), a static memory 1306 (e.g., flash memory, static random access memory (SRAM), etc.), and a secondary memory (e.g., a data storage device 1318), which can communicate with each other via a bus 1330.

Processing device 1302 represents one or more general-purpose processing devices such as a microprocessor, central processing unit, or the like. More particularly, processing device 1302 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1302 can also be one or more special-purpose processing devices such as an application specific integrated circuit (ASIC), a field programmable gate array (FPGA), a digital signal processor (DSP), network processor, or the like. In accordance with one or more aspects of the disclosure, processing device 1302 can be configured to execute instructions performing any of the operations performed by the AV 100.

Example computer device 1300 can further comprise a network interface device 808, which can be communicatively coupled to a network 1320. Example computer device 1300 can further comprise a video display 1310 (e.g., a liquid crystal display (LCD), a touch screen, or a cathode ray tube (CRT)), an alphanumeric input device 1312 (e.g., a keyboard), a cursor control device 1314 (e.g., a mouse), and an acoustic signal generation device 1316 (e.g., a speaker).

Data storage device 1318 can include a computer-readable storage medium (or, more specifically, a non-transitory computer-readable storage medium) 1328 on which is stored one or more sets of executable instructions 1322. In accordance with one or more aspects of the disclosure, executable instructions 1322 can comprise executable instructions to perform any of the operations of AVCS 140.

Executable instructions 1322 can also reside, completely or at least partially, within main memory 1304 and/or within processing device 1302 during execution thereof by example computer device 1300, main memory 1304 and processing device 1302 also constituting computer-readable storage media. Executable instructions 1322 can further be transmitted or received over a network via network interface device 1308.

While the computer-readable storage medium 1328 is shown in FIG. 13 as a single medium, the term "computer-readable storage medium" should be taken to include a single medium or multiple media (e.g., a centralized or distributed database, and/or associated caches and servers) that store the one or more sets of VM operating instructions.

The term "computer-readable storage medium" includes any medium that is capable of storing or encoding a set of instructions for execution by the machine that cause the machine to perform any one or more of the methods described herein. The term "computer-readable storage medium" includes, but is not limited to, solid-state memories, and optical and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the disclosure is not described with reference to any particular programming language. It will be appreciated that a variety of programming languages can be used to implement the teachings of the disclosure as described herein.

The disclosure can be provided as a computer program product, or software, that can include a machine-readable medium having stored thereon instructions, which can be used to program a computer system (or other electronic devices) to perform a process according to the disclosure. A machine-readable medium includes any mechanism for storing information in a form readable by a machine (e.g., a computer). In some implementations, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation," "one implementation," "some implementations," "an implementation," "one implementation," "some implementations," or the like throughout may or may not mean the same implementation or implementation. One or more implementations or implementations described herein may be combined in a particular implementation or implementation. The terms "first," "second," "third," "fourth," etc. as used herein are meant as labels to distinguish among different elements and may not necessarily have an ordinal meaning according to their numerical designation.

In the foregoing specification, implementations of the disclosure have been described with reference to specific example implementations thereof. It will be evident that various modifications can be made thereto without departing from the broader spirit and scope of implementations of the disclosure as set forth in the following claims. The specification and drawings are, accordingly, to be regarded in an illustrative sense rather than a restrictive sense.

What is claimed is:

1. A system comprising:
a memory device; and
a processing device, operatively coupled to the memory device, to:
  obtain a representation of a drivable space for an autonomous vehicle (AV);
  obtain, based on the representation of the drivable space, a set of motion parameters and a set of equipotential contour curves;
  generate, based on the set of motion parameters and the set of equipotential contour curves, a motion planning blueprint from a flow field modeling the drivable space;
  identify, using the motion planning blueprint, a driving path of the AV within the drivable space; and
  cause the AV to follow the driving path.

2. The system of claim 1, wherein:
the representation of the drivable space comprises a discretized representation of the drivable space comprising a first end corresponding to a traffic inlet and a second end corresponding to a traffic outlet; and
to generate the motion planning blueprint, the processing device is further to:
  convert the discretized representation of the drivable space into a flow field data structure;

obtain the set of motion parameters and the set of equipotential contour curves based on the flow field data structure;

generate a set of geometric samples using the set of motion parameters and the set of equipotential contour curves; and construct the motion planning blueprint based on the set of geometric samples.

3. The system of claim 2, wherein, to obtain the representation of the drivable space, the processing device is further to:

receive a second representation of the drivable space; and convert the second representation of the drivable space into the discretized representation of the drivable space.

4. The system of claim 2, wherein:

to convert the discretized representation into the flow field data structure, the processing device is further to determine a value assigned to each cell of a plurality of cells of the discretized representation;

the plurality of cells comprises a first cell having a first value located at the first end, a second cell having a second value located at the second end, and a third cell having a third value located at an intermediate region between the first end and the second end;

the second value is greater than the first value; and the third value is between the first value and the second value.

5. The system of claim 1, wherein the set of motion parameters comprises an interpolated heading of a location within the representation of the drivable space and an interpolated curvature of the location within the representation of the drivable space.

6. The system of claim 5, wherein the interpolated heading is obtained as an interpolated gradient corresponding to the location, and wherein the interpolated curvature is obtained from an interpolated Hessian corresponding to the location.

7. The system of claim 2, wherein the motion planning blueprint comprises a graph including a plurality of nodes and a plurality of edges, wherein each node of the plurality of nodes corresponds to a geometric sample of the set of geometric samples positioned with respect to a location on a corresponding equipotential contour curve of the set of equipotential contour curves, and wherein the plurality of edges comprises an edge connecting a first node on a first equipotential contour curve reachable to a second node on a second equipotential contour curve different from the first equipotential contour curve.

8. A method comprising:

obtaining, by a processing device, a representation of a drivable space for an autonomous vehicle (AV);

obtaining, by the processing device based on the representation of the drivable space, a set of motion parameters and a set of equipotential contour curves;

generating, by the processing device based on the set of motion parameters and the set of equipotential contour curves, a motion planning blueprint from a flow field modeling the drivable space;

identifying, by the processing device using the motion planning blueprint, a driving path of the AV within the drivable space; and causing, by the processing device, the AV to follow the driving path.

9. The method of claim 8, wherein:

the representation of the drivable space is a discretized representation of the drivable space comprising a first end corresponding to a traffic inlet and a second end corresponding to a traffic outlet; and the generating the motion planning blueprint further comprises:

converting, by the processing device, the discretized representation of the drivable space into a flow field data structure;

obtaining the set of motion parameters and the set of equipotential contour curves based on the discretized representation and the flow field data structure;

generating, by the processing device, a set of geometric samples using the set of motion parameters and the set of equipotential contour curves; and constructing the motion planning blueprint based on the set of geometric samples.

10. The method of claim 9, wherein obtaining the representation of the drivable space further comprises:

receiving, by the processing device, a second representation of the drivable space; and converting the second representation of the drivable space into the discretized representation of the drivable space.

11. The method of claim 9, wherein:

converting the discretized representation into the flow field data structure further comprises determining a value assigned to each cell of a plurality of cells of the discretized representation;

the plurality of cells comprises a first cell having a first value located at the first end, a second cell having a second value located at the second end, and a third cell having a third value located at an intermediate region between the first end and the second end;

the second value is greater than the first value; and the third value is between the first value and the second value.

12. The method of claim 9, wherein:

the set of motion parameters comprises an interpolated heading of a location within the discretized representation and an interpolated curvature of the location within the discretized representation;

the interpolated heading is obtained as an interpolated gradient corresponding to the location; and the interpolated curvature is obtained from an interpolated Hessian corresponding to the location.

13. The method of claim 9, wherein the motion planning blueprint comprises a graph including a plurality of nodes and a plurality of edges, wherein each node of the plurality of nodes corresponds to a geometric sample of the set of geometric samples positioned with respect to a location on a corresponding equipotential contour curve of the set of equipotential contour curves, and wherein the plurality of edges comprises an edge connecting a first node on a first equipotential contour curve reachable to a second node on a second equipotential contour curve different from the first equipotential contour curve.

14. A non-transitory computer-readable storage medium having instructions stored thereon that, when executed by a processing device, cause the processing device to perform operations comprising:

obtaining a discretized representation of a drivable space for an autonomous vehicle (AV), wherein the discretized representation of the drivable space comprises a plurality of cells, a first end corresponding to a traffic inlet and a second end corresponding to a traffic outlet;

obtaining, based on the discretized representation of the drivable space, a set of motion parameters and a set of equipotential contour curves, wherein obtaining the set of motion parameters and the set of equipotential contour curves comprises converting the discretized representation of the drivable space into a flow field data structure modeling the drivable space by determining a value assigned to each cell of the plurality of cells of the discretized representation of the drivable space, wherein the first end comprises a first cell having a first value corresponding to a lower bound of a range of values, and wherein the second end comprises a second cell having a second potential value corresponding to an upper bound of the range of values;

generating, based on the set of motion parameters and the set of equipotential contour curves, a motion planning blueprint from the flow field data structure;

identifying, using the motion planning blueprint, a driving path of the AV within the drivable space; and causing the AV to follow the driving path.

15. The non-transitory computer-readable storage medium of claim 14, wherein generating the motion planning blueprint further comprises:

generating a set of geometric samples using the set of interpolated motion parameters and the set of contour curves; and constructing the motion planning blueprint based on the set of geometric samples.

16. The non-transitory computer-readable storage medium of claim 14, wherein:

the set of motion parameters comprises an interpolated heading of a location within the discretized representation and an interpolated curvature of the location within the discretized representation;

the interpolated heading is obtained as an interpolated gradient corresponding to the location; and the interpolated curvature is obtained from an interpolated Hessian corresponding to the location.

17. The non-transitory computer-readable storage medium of claim 15, wherein the motion planning blueprint comprises a graph including a plurality of nodes and a plurality of edges, wherein each node of the plurality of nodes corresponds to a geometric sample of the set of geometric samples positioned with respect to a location on a corresponding equipotential contour curve of the set of equipotential contour curves, and wherein the plurality of edges comprises an edge connecting a first node on a first equipotential contour curve reachable to a second node on a second equipotential contour curve different from the first equipotential contour curve.

18. The non-transitory computer-readable storage medium of claim 14, wherein obtaining the discretized representation of the drivable space further comprises:

receiving an input representation of the drivable space; and converting the input representation of the drivable space into the discretized representation of the drivable space.

* * * * *